US011120602B2

(12) United States Patent
Nevraev et al.

(10) Patent No.: US 11,120,602 B2
(45) Date of Patent: Sep. 14, 2021

(54) ACCELERATION OF SHADER PROGRAMS BY COMPILER PRECISION SELECTION

(71) Applicant: Microsoft Technology Licensing, LLC, Redmond, WA (US)

(72) Inventors: Ivan Nevraev, Redmond, WA (US); Vishal Chandra Sharma, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 16/429,989

(22) Filed: Jun. 3, 2019

(65) Prior Publication Data

US 2020/0380754 A1  Dec. 3, 2020

(51) Int. Cl.
*G06T 15/00* (2011.01)
*G06F 8/41* (2018.01)
*G06T 1/20* (2006.01)

(52) U.S. Cl.
CPC ............ *G06T 15/005* (2013.01); *G06F 8/41* (2013.01); *G06T 1/20* (2013.01)

(58) Field of Classification Search
CPC ... G06F 9/30025; G06F 9/30014; G06T 1/20; G06T 15/005
See application file for complete search history.

(56) References Cited

U.S. PATENT DOCUMENTS

| 2004/0093319 A1 | 5/2004 | Ogasawara et al. |
| 2005/0065990 A1* | 3/2005 | Allen ................. G06F 9/45504 708/495 |
| 2010/0094882 A1* | 4/2010 | Lee ..................... G06F 16/2471 707/755 |
| 2016/0357534 A1 | 12/2016 | Krishnamoorthi et al. |
| 2018/0113678 A1* | 4/2018 | Sadowski ............. G06F 7/4824 |
| 2018/0315157 A1* | 11/2018 | Ould-Ahmed-Vall ....... G06N 20/00 |
| 2019/0310864 A1* | 10/2019 | Gutierrez ............... G06N 3/063 |

FOREIGN PATENT DOCUMENTS

EP   3396547 A2   10/2018

OTHER PUBLICATIONS

Ho, et al., "Exploiting Half Precision Arithmetic in Nvidia GPUs", In Proceedings of IEEE High Performance Extreme Computing Conference, Sep. 12, 2017, 7 Pages.
"International Search Report and Written Opinion Issued in PCT Application No. PCT/US20/028606", dated Aug. 5, 2020, 16 Pages.

* cited by examiner

*Primary Examiner* — Weiming He
(74) *Attorney, Agent, or Firm* — Ray Quinney & Nebeker; Tiffany Healy (57) ABSTRACT

Methods and devices for lowering precision of computations used in shader programs may include receiving program code for a shader program to use with a graphics processing unit (GPU) that supports half precision storage and arithmetic in shader programs. The methods and devices may include performing at least one pass on the program code to select a set of operations within the program code to lower a precision of a plurality of computations used by the set of operations and evaluating a risk of precision loss for lowering the precision to a half precision for each computation of the plurality of computations. The methods and devices may include generating edited program code by rewriting the computation to the half precision in response to the risk of precision loss being a precision loss threshold.

20 Claims, 5 Drawing Sheets

ACCELERATION OF SHADER PROGRAMS BY COMPILER PRECISION SELECTION

BACKGROUND

The present disclosure relates to graphics processing on a computer device, and more particularly, to devices and methods of compiling shader program code.

Games typically use tens of thousands of graphic shader programs within the game to generate appropriate levels of colors and/or special effects for images within the games. Developers trying improve the performance of the shader programs may have a difficult time due to the large number of shader programs within a game. The processing and/or performance of the graphic shaders may determine the performance of the game and/or power consumption of the computer device.

Thus, there is a need in the art for improvements in performance of graphic shaders.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a graphics processing unit (GPU) that supports half precision storage and arithmetic in shader programs, a memory to store data and instructions, at least one processor configured to communicate with the memory, and a compiler configured to communicate with the memory and the at least one processor, wherein the compiler is operable to: receive program code for a shader program to use with the GPU; perform at least one pass on the program code to select a set of operations within the program code to lower a precision of a plurality of computations used by the set of operations; evaluate a risk of precision loss for lowering the precision for a computation to a half precision for each computation of the plurality of computations; generate edited program code by rewriting the computation to the half precision in response to the risk of precision loss being below a precision loss threshold; and provide a notification with a warning for precision loss in response to the risk of precision loss being above the precision loss threshold.

Another example implementation relates to a method for lowering precision of computations used in shader programs. The method may include receiving, at a compiler on a computer device, program code for a shader program to use with a graphics processing unit (GPU) that supports half precision storage and arithmetic in the shader programs. The method may include performing at least one pass on the program code to select a set of operations within the program code to lower a precision of a plurality of computations used by the set of operations. The method may include evaluating a risk of precision loss for lowering the precision for a computation to a half precision for each computation of the plurality of computations. The method may include generating edited program code by rewriting the computation to the half precision in response to the risk of precision loss being below a precision loss threshold. The method may include providing a notification with a warning for precision loss in response to the risk of precision loss being above the precision loss threshold.

Another example implementation relates to computer-readable medium storing instructions executable by a computer device. The computer-readable medium may include at least one instruction for causing the computer device to receive program code for a shader program to use with a graphics processing unit (GPU) that supports half precision storage and arithmetic in shader programs. The computer-readable medium may include at least one instruction for causing the computer device to perform at least one pass on the program code to select a set of operations within the program code to lower a precision of a plurality of computations used by the set of operations. The computer-readable medium may include at least one instruction for causing the computer device to perform at least one pass on the program code to evaluate a risk of precision loss for lowering the precision for a computation to a half precision for each computation of the plurality of computations. The computer-readable medium may include at least one instruction for causing the computer device to generate edited program code by rewriting the computation to the half precision in response to the risk of precision loss being below a precision loss threshold. The computer-readable medium may include at least one instruction for causing the computer device to provide a notification with a warning for precision loss in response to the risk of precision loss being above the precision loss threshold.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

This disclosure relates to devices and methods for using a compiler to aid in lowering precision of computations used in shader programs to use with graphics hardware, such as a graphics processing unit (GPU). A computer device executing a game application typically uses tens of thousands of shader programs within the game to generate appropriate levels of colors and/or special effects for images within the game. For example, the shader programs may operate on data stored in a computer number format such as a single precision floating point format, which occupies 32 bits of computer memory. Modern graphics hardware supports half precision storage and/or arithmetic in shader programs, where half precision refers to a binary floating-point computer number format that occupies 16 bits of computer memory. Using half precision storage and/or arithmetic in shader programs provides benefits to performance of the shader program due to increasing a number of shader programs in flight, improving throughput of the arithmetic computations, and/or speeding up memory access.

However, not all computations used in shader programs can tolerate reduced precision and/or range formats without degrading image quality in the output (e.g., a rendered target in a game or application). In addition, it may be difficult to predict the cost of adding half precision to shader programs due to the conversions from single precision to half precision and back. Moreover, the work involved in manual conversion of shader programs to use half precision may be impractical given the large number of shaders within a game (e.g., tens of thousands of shaders). As such, identifying computations within shader programs that can tolerate reduced precision, range, and/or editing the shaders by hand results in a huge amount of work for developers of shader programs.

The devices and methods of this disclosure may provide an automated process within the compiler to identify computations in shader programs where precision may be lowered and/or where precision loss may be acceptable. For example, the compiler may build a dependency chain from the outputs in shader programs that are known to use half precision (e.g., output to a render target or any other output marked as half in the shader). In addition, the compiler may build a dependency chain from inputs in shader programs that are known to use half precision. For example, a input layout to Vertex Shaders may specify R16G16B16A16_FLOAT format, which is known to use half precision. After identifying the outputs and the corresponding dependency chain, the compiler may evaluate the resulting expressions and may attempt to lower precision of intermediates, function parameters, memory loads, and/or any other instructions within dependency chain of the output while monitoring for instructions that may be sensitive to precision. Instructions that may be sensitive to precision and/or changes in precision may include, but are not limited to, trigonometric instructions or transcendental instructions. For example, instructions may be sensitive to precision and/or changes in precision when values of the computations may exceed expected ranges and/or precision bounds when precision is lowered.

In addition, the compiler may weigh the cost of conversion operations and/or any power consumption benefits from the conversion operations in determining whether the precision may be lowered and/or where precision loss may be acceptable. For example, the compiler may weigh the runtime cost for the conversions (e.g., the time and/or power consumed by performing the conversions) against the benefits of the conversions to determine whether the precision may be lowered. In addition, the power consumption benefits to the computer device may outweigh the loss in precision that may occur from lowering the precision of the computations. As such, the complier may determine that precision loss may be acceptable and may lower the precision of the computations in order to benefit from the power consumption savings when using half precision computations. For parts of the expression chain with a low risk of precision loss, the compiler may generate edited program code by rewriting the expression using half precision arithmetic. The compiler may also provide a report of changes with information about the changes made to the shader program.

The devices and methods of this disclosure may also receive user input turning off or on analysis of specific instructions within the shader program for evaluating whether precision may be lowered for the identified instructions. As such, the devices and methods may provide users a mechanism at the language level to control in a more fine grained way turning off or on analysis of specific instructions within the program code.

The devices and methods may also provide a tool for users to use during the development of the shader programs that helps users quantify precision losses due to lowering the precision of selected computations in edited program code for the shader program. For example, the tool may allow users to open a game and/or a trace of a game so that the users may run the edited program code with the lower precision and evaluate whether the image quality output as a result of the lower precision may be acceptable for use with the game. The tool may also provide users additional information and/or explanations for the loss of precision that may occur in the outputs of the game.

By reducing the precision of a portion of the instructions within the shader programs, the performance of graphics processing, in general, and the shader programs, in particular, may be improved by increasing a number of shader programs in flight, improving throughput of the arithmetic computations and speeding up memory access. As such, the described methods and devices may improve the performance of graphics processing and shader programs by identifying a set of instructions and/or operations within the shader programs where precision may be reduced and/or automatically reducing the precision in the identified set of instructions.

Figure 1:
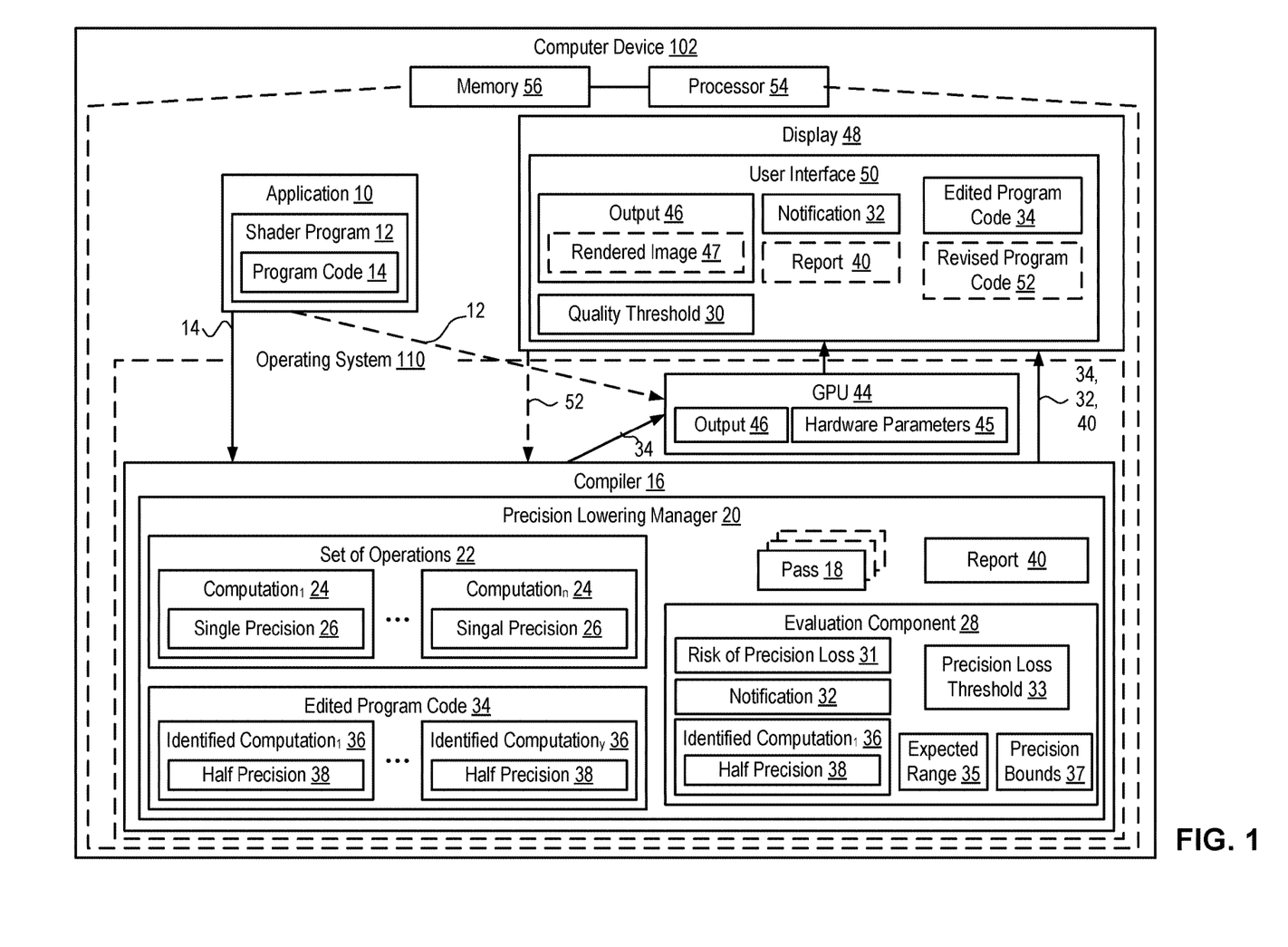
FIG. 1 is a schematic block diagram of an example computer device in accordance with an implementation of the present disclosure.

Referring now to FIG. 1, illustrated therein is an example computer device 102 for use with lowering precision in computations 24 used in shader programs 12. Computer device 102 may include a plurality of applications 10 executed or processed by processor 54 and/or system memory 56 of computer device 102. A user may have developed program code 14 for one or more shader programs 12 within application 10 that the processor 54 may cause to be executed by a graphics processing unit (GPU) 44 for rendering graphics data of an image to be displayed. In addition, computer device 102, or another computing device, may have automatically generated program code 14 for one or more shader programs 12. For example, application 10 may cause the GPU 44 to use tens of thousands of shaders associated with the execution of the program code 14 of the shader program 12 within application 10 to generate appropriate levels of colors and/or special effects for images associated with running the application 10, such as, for use with games. Thus, GPU 44 may execute shader program code 14 and may render an output 46 that may include one or more rendered images 47 for presentation on display 48.

In addition, GPU 44 may support half precision in data storage and/or computations or arithmetic in one or more portions of the program code of shader programs 12. For example, the present disclosure enables one or more portions of the program code 14, such as portions associated with storage and/or arithmetic and originally in a single precision format, to be replaced with a corresponding one or more portions of edited program code 34 using half precision 38 in storage and/or arithmetic. By using half precision storage and/or arithmetic, the performance of the shader program 12 with the edited program code 34 may be improved. For example, the number of shader programs 12 in flight in GPU 44 may increase. In addition, the throughput in GPU 44 of the remaining, unedited portions of the program code 14, such as arithmetic computations 24 in single precision 26 used in shader program 12, may improve, too, as memory accesses by GPU 44 may be sped up.

Computer device 102 may include any mobile or fixed computer device, which may be connectable to a network. Computer device 102 may be, for example, a computer device such as a desktop or laptop or tablet computer, an internet of things (IOT) device, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

Computer device 102 may include an operating system 110 executed by processor 54 and/or memory 56. Memory 56 of computer device 102 may be configured for storing data and/or computer-executable instructions defining and/or associated with operating system 110, and processor 54 may execute such data and/or instructions to instantiate operating system 110. An example of memory 56 can include, but is not limited to, a type of memory usable by a computer, such as random access memory (RAM), read only memory (ROM), tapes, magnetic discs, optical discs, volatile memory, non-volatile memory, and any combination thereof. An example of processor 54 can include, but is not limited to, any processor specially programmed as described herein, including a controller, microcontroller, application specific integrated circuit (ASIC), field programmable gate array (FPGA), system on chip (SoC), or other programmable logic or state machine.

Operating system 110 may include a compiler 16 that a may be used to verify and/or improve program code 14. In addition, compiler 16 may be used to port program code 14 to half precision 38 arithmetic by safely lowering precision of operations within shader program 12 from single precision 26 to half precision 38. Compiler 16 may also be used to verify whether a potential change to lower precision may be worthwhile before modifying program code 14 with the lower precision. In an aspect, a user of computer device 102 may load program code 14 into compiler 16 using user interface 50. In another aspect, application 10 may automatically transmit program code 14 to complier 16.

Compiler 16 may have a precision lowering manager 20 operable to perform one or more passes 18 on program code 14 to automatically search for opportunities for precision lowering in program code 14. Precision lowering manager 20 may identify a set of operations 22 within program code 14 that may tolerate a lower precision and/or range. The set of operations 22 may include a plurality of computations 24 (up to n, where n is an integer) that are currently performed at single precision 26.

Precision lowering manager 20 may analyze a structure of the program code 14 and/or the shader program 12 and/or hardware parameters 45 of GPU 44 in determining whether the set of operations 22 may tolerate a lower precision and/or range. Hardware parameters 45 of GPU 44 may include, but are not limited to, power consumption of the GPU 44, whether the GPU 44 supports half precision 38, and/or performance of the GPU 44. In addition, a list of previously defined operations that support half precision 38 may be used by precision lowering manager 20 in determining the set of operations 22 that may tolerate a lower precision and/or range. For example, operations such as, but not limited to, reading from an image and/or texture, reading from a buffer, low precision input from the vertex (e.g., 8 or 10 bit precision color inputs), and/or output to a render target may be known to operate at half precision 38. Moreover, operations known by precision lowering manager 20 that are sensitive to precision (e.g., trigonometric instructions or transcendental instructions) may not be included in the set of operations 22.

Precision lowering manager 20 may include an evaluation component 28 that may determine whether to lower the precision of the computations 24 within the set of operations 22. Evaluation component 28 may evaluate the resulting expressions of the set of operations 22 and may attempt to lower precision of intermediates, function parameters, memory loads, and/or any other computation 24 while watching out for computations 24 that may be sensitive to precision and/or weighing a cost (e.g., the time and/or power consumption) of conversion operations. As such, evaluation component 28 may identify a possible outcome when computation 24 is lowered to half precision 38.

Evaluation component 28 may attach ranges and precision information to each computation 24 in a set of operations 22 and may track the ranges and precision information through the set of operations 22. For example, the set of operations 22 may be an expression tree with a chain of computations 24 that may be performed in a specified order. Evaluation component 28 may compare the ranges and/or precision information for each computation 24 to an expected range 35 and/or precision bounds 37 for the values on the computation path. For each computation 24 on the computation path, evaluation component 28 may score possible losses against the expected range 35 and/or precision bounds 37. Evaluation component 28 may determine a risk of precision loss 31 using the comparison of the ranges and precision information with the expected range 35 and/or precision bounds 37.

For example, evaluation component 28 may receive a range of x=7000 for a value of a computation 24. Evaluation component 28 may determine that range x=7000 is inside an expected range 35 for the computation 24 (e.g., the range is inside the range for half precision values). In another example, evaluation component 28 may receive a range of x=70000. Evaluation component 28 may determine that range x=70000 exceeds an expected range 35 for the computation 24 (e.g., the range is outside of the range for half precision values) and may set the risk of precision loss 31 in response to the determination that the range exceeds the expected range 35.

For each computation 24 of the set of operations 22, evaluation component 28 may determine a risk of precision loss 31 and may compare the risk of precision loss to a precision loss threshold 33. The precision loss threshold 33 may identify whether the computation 24 support half precision 38 and/or whether the computation 24 may be sensitive to half precision 38. For example, the risk of precision loss 31 may be above the precision loss threshold 33 if the computation 24 does not work with lower precision (e.g., raising values to a power). In addition, the risk of precision loss 31 may be above the precision loss threshold 33 if GPU 44 does not support lower precisions. The risk of precision loss 31 may be below the precision loss threshold 33 if the computation 24 supports lower precision and/or if GPU 44 supports lower precisions.

When the risk of precession loss 31 is above the precision loss threshold 33, evaluation component 28 may generate a notification 32 with a warning indicating that the computation 24 may not support half precision 38. Compiler 16 may transmit notification 32 to user interface 50 so that a user may use the information when editing program code 14.

Evaluation component 28 may also take into account power consumption benefits from the conversion operations in determining whether the precision may be lowered and/or where precision loss may be acceptable for the set of operations 22. The power consumption benefits to computer device 102 that may occur when using half precision 38 in the computations 24 may outweigh the loss in precision that may occur from lowering the precision of the computations 24. For example, evaluation component 28 may determine that the risk of precision loss 31 is above the precision loss threshold 33, but may determine the precision of loss may be acceptable in order to gain the benefit of the power consumption savings to computer device 102 when using the half precision 38 in the computations 24. As such, evaluation component 28 may modify the risk of precision loss 31 in response to determining the power consumption benefits outweigh the loss in precision. In addition, evaluation component 28 may send a notification 32 with information about the potential power consumption benefits to computer device 102 by using the half precision 38 in the computations 24 and/or information about the potential loss in precision for using the half precision 38.

When the risk of precession loss 31 is below the precision loss threshold 33, evaluation component 28 may identify the computation 36 has supporting half precision 38. As such, evaluation component 28 may perform an iterative process in determining whether to lower the precision of the computations 24 within the set of operations 22.

In an aspect, precision lowering manager 20 may automatically generate edited program code 34 by rewriting the precision of the identified computations 36 with half precision 38. Precision lowering manager 20 may also generate a report 40 with information of the changes made to the precision. For example, report 40 may include the identified computations 36 and/or set of operations 22. Report 40 may also include explanations for the changes to the precision and/or decision to not lower the precision. In another aspect, report 40 may include the identified computations 36 for half precision 38 and the report 40 may be transmitted to user interface 50 for a user to review and/or modify program code 14 in response to the information provided in report 40.

Compiler 16 may transmit the edited program code to GPU 44 for processing. GPU 44 may execute the edited program code 34 using the half precision 38 for the identified computations 36 to generate output 46 for presentation on display 48. By using half precision 38 in the identified computations 36, the throughput in GPU 44 of the identified computations 36 used in shader program 12 may improve, as well as speeding up memory accesses by GPU 44.

In addition, compiler 16 may transmit edited program code 34 and/or report 40 to user interface 50 for display. In an aspect, a user may use the information in report 40 to perform further edits to program code 14 and/or edited program code 34 and create revised program code 52. For example, a user may change the precision of the identified computations 36 in the program code 14. In addition, the user may select to change a portion of the identified computations to half precision 38. As such, the user may use the provided information as a guide to lowering precision within shader program 12.

A user may also identify one or more computations 24 where precision may be lowered within the shader program code 14 and transmit the computations 24 to compiler 16 for evaluation. For example, the user may insert one or more mechanisms at the language level to identify such computations 24, such as but not limited to, source code user-supplied attributes and/or annotations. Evaluation component 28 may evaluate whether precision may be lowered for the computations 24 and may provide notifications 32 to the user with warnings about possible precision loss. The user may change the precision of the computations 24 in response to the information received from compiler 16 and may generate revised program code 52. The revised program code 52 may be transmitted to compiler 16 for further evaluation, as discussed above in respect to the program code 14.

In addition, the user may open application 10 or a trace of application 10 using user interface 50 and may run the received edited program code 34 from compiler 16 using the application 10 to verify whether the quality of the output 46 is acceptable. For example, the image quality of rendered image 47 may be compared to a quality threshold 30 to determine whether quality of the rendered image 47 is acceptable. When there is little to no loss in image quality of the rendered image 47, the quality of the rendered image 47 may be acceptable. As such, the shader program 12 may tolerate reduced precision without degrading image quality in the output 46.

When there is a loss in image quality, the user may revise the edited program code 34 and generate revised program code 52 changing the amount of lower precision used in the shader program 12. In addition, when there is a loss in image quality, the user may make adjustments to the analysis performed by compiler 16. The user may remove specific instructions from the search performed by compiler 16, for example, by annotating computation chains in the shader program code 14 with attributes so that the compiler may not identify the instructions as tolerating lower precision. In addition, a user may turn off the pass 18 that performs the search to identify the set of operations 22 where precision may be lowered.

As such, users may be able to port shader programs 12 to half precision 38 arithmetic safely and quickly. Moreover, by compiler 16 14 automatically identifying sets of operations 22 where precision may be lowered and/or automatically editing program code 14 to include half precision 38, a larger number of users may be able to improve performance of the shader programs 12. As such, the improvement in performance of shader programs 12 may be scalable so that more shader programs 12 may be able to use the lower precision supported by hardware.

Figure 2:
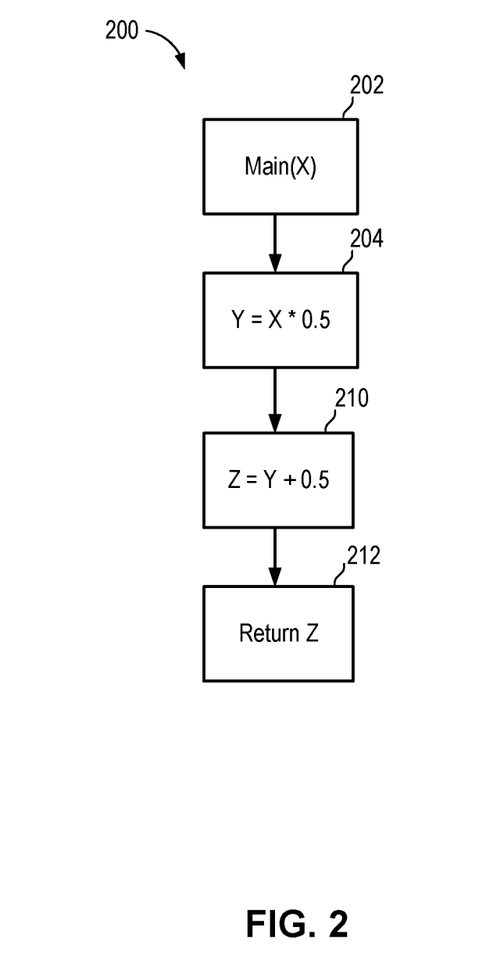
FIG. 2 is an example of an expression tree with a set of operations in accordance with an implementation of the present disclosure.

Referring now to FIG. 2, an example expression tree 200 with a set of operations 22 is illustrated. Expression tree 200 may include a set of operations 22 with a chain of computations 202, 204, 210, 212 to be performed in a specified order. For example, the chain of computations may start with computation 202 and may proceed in order until the end of the expression tree 200 with computation 212.

Evaluation component 28 (FIG. 1) may attach ranges and precision information to each computation 202, 204, 210, 212 in the expression tree 200 to determine whether any of the computations 202, 204, 210, 212 may be lowered to a half precision 38. Evaluation component 28 may start at the bottom of the expression tree 200 (e.g., computation 212) and work up the chain of computations to the start of the expression tree 200 (e.g., computation 202). Evaluation component 28 and may track the ranges and precision information through the expression tree 200 to determine whether the computations 202, 204, 210, 212 may be lowered to half precision 38.

Evaluation component 28 may compare the ranges and/or precision information for each computation 202, 204, 210, 212 to an expected range 35 and/or precision bounds 37 for the values on the computation path. For each computation 202, 204, 210, 212 on the computation path, evaluation component 28 may score possible losses against the expected range 35 and/or precision bounds 37. Evaluation component 28 may determine a risk of precision loss 31 using the comparison of the ranges and precision information with the expected range 35 and/or precision bounds 37.

At 212, evaluation component 28 may know for the set of operations 22 in the expression tree 200 that Z is output in half precision 38. For example, evaluation component 28 may know that the output of Z is always within a range of 0 to 1 and the precision of Z is with the half precision 38 in response to knowledge of how the hardware works and/or how the shader works for the set of operations 22 in the expression tree 200. For example, the set of operations 22 in the expression tree 200 may be for outputting a color and evaluation component 28 may know that color outputs are performed at half precision 38.

At computation 210, evaluation component 28 may determine that the expected range 35 for Y may be between −0.5 to 0.5 and that the precision bounds 37 may remain the same in response to computation 210 being lowered to a half precision 38. As such, evaluation component 28 may determine that computation 210 may be lowered to half precision 38 since the output of Z may remain within a range of 0 to 1 with the expected range 35 for Y between −0.5 to 0.5 and the precision remains the same.

At computation 204, evaluation component 28 may determine that the expected range for X may be between −1 to 1 and that the precision bounds 37 may remain the same in response to computation 204 being lowered to a half precision 38. Evaluation component 28 may determine that computation 204 may be lowered to half precision 38 since the output of Z may remain within a range of 0 to 1 with the expected range 35 for X between −1 to 1 and the precision remains the same.

As such, evaluation component 28 may determine to lower the precisions of all the computations 202, 204, 210, 212 in the expression tree 200.

In an alternative example, at computation 204, evaluation component 28 may determine that the expected range for X may be between −1 to 1 but that precision changes to 0.3333 in response to computation 204 being lowered to a half precision 38. Evaluation component 28 may determine that the precision 0.3333 is outside of the precision bounds 37 and that computation 204 may not be lowered to half precision 38 because the precision exceeds the precision bounds 37. Evaluation component 28 may determine to lower the precision for computations 210, 212 while maintaining computation 204 at single precision.

As such, evaluation component 28 may lower the precision of all the computations in an expression tree 200. In addition, evaluation component 28 may lower a portion of the computations in an expression tree 200 to a lower precision, while maintaining other computations in the expression tree 200 at a single precision. Evaluation component 28 may also determine that none of the computations in the expression tree 200 may use lower precision and may maintain all the computations in the expression tree 200 at a single precision.

Figure 3:
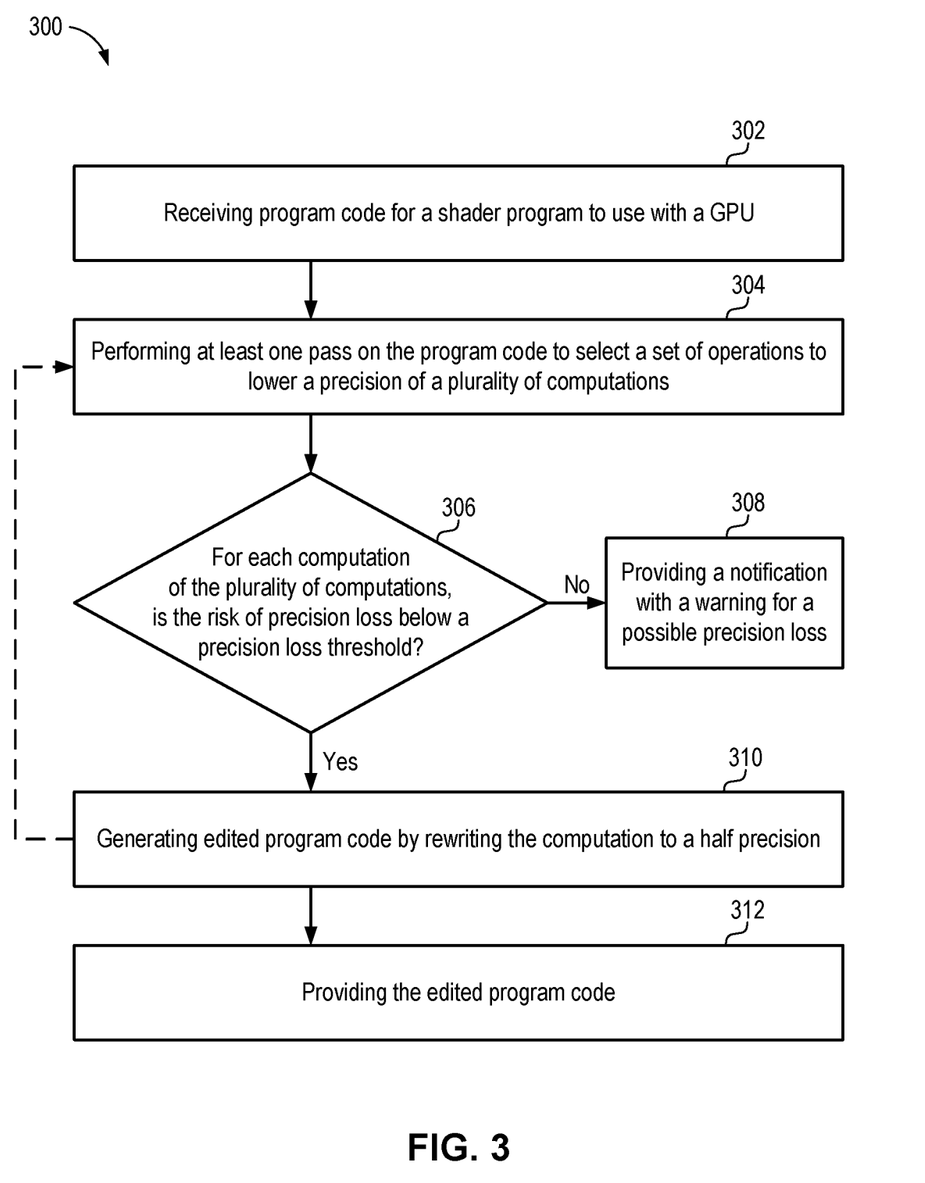
FIG. 3 is a flowchart of an example method for lowering precision of computations used in shader programs in accordance with an implementation of the present disclosure.

Referring now to FIG. 3, an example method 300 may be used by computer device 102 (FIG. 1) to lower precision of computations 24 (FIG. 1) used in shader programs 12 (FIG. 1). The actions of method 300 may be discussed below with reference to the architecture of FIG. 1.

At 302, method 300 may include receiving program code for a shader program to use with a GPU. For example, Compiler 16 may receive program code 14 for a shader program 12 to use with GPU 44 that supports half precision 38 storage and/or arithmetic in shader programs 12. A user of computer device 102 may load program code 14 into compiler 16 using user interface 50. In addition, application 10 may automatically transmit program code 14 to complier 16.

At 304, method 300 may include performing at least one pass on the program code to select a set of operations to lower a precision of a plurality of computations. Compiler 16 may have a precision lowering manager 20 operable to perform one or more passes 18 on program code 14 to automatically search for opportunities for precision lowering in program code 14. Precision lowering manager 20 may identify a set of operations 22 within program code 14 that may tolerate a lower precision and/or range. For example, a precision loss threshold 33 may determine an error value range for an expected range 35 and/or precision bounds 37. When the error value range for the set of operations 22 is lower than the precision loss threshold 33, the set of operations 22 may be identified as tolerating a lower precision. The set of operations 22 may include a plurality of computations 24 that are currently performed at a single precision 26. Moreover, the set of operations 22 may include a plurality of computations 24 performed in a specified order. For example, the set of operations 22 may be an expression tree with a chain of computations 24 to be performed in an order.

Precision lowering manager 20 may analyze a structure of the shader program 12, such as, the control flow of the shader program 12, and/or hardware parameters 45 of GPU 44 in determining whether the set of operations 22 may tolerate a lower precision and/or range. In addition, a list of previously defined operations that support half precision 38 may be used by precision lowering manager 20 in determining the set of operations 22 that may tolerate a lower precision and/or range. For example, operations such as, but not limited to, reading from an image and/or texture, reading from a buffer, low precision input from the vertex (e.g., 8 or 10 bit precision color inputs), and/or output to a render target may be known to operate at half precision 38. Moreover, operations known by precision lowering manager 20 that are sensitive to precision (e.g., trigonometric instructions or transcendental instructions) may not be included in the set of operations 22. As such, the search performed by precision lowering manager 20 may be a guided and/or intelligence search trained through previous knowledge of the hardware and/or operations used by the shader program 12.

At 306, method 300 may include for each computation of the plurality of computations, determining whether the risk of precession loss is below a precision loss threshold. Precision lowering manager 20 may include an evaluation component 28 that may determine whether to lower the precision of the computations 24 within the set of operations 22 by evaluating the resulting expressions of the set of operations 22. Evaluation component 28 may attempt to lower precision of intermediates, function parameters, memory loads, and/or any other computation 24 while monitoring for computations 24 that may be sensitive to precision and/or weighing a cost of conversion operations. For example, values of the computations 24 may be compared with an expected range 35 (e.g., minimum and maximum for the values) and/or precision bounds 37 (e.g., a number of digits for the values). The computations 24 may be considered sensitive to precision in response to the values being outside the expected range 35 and/or precision bounds 37. As such, evaluation component 28 may identify a possible outcome and/or risk of precision loss 31 when computation 24 is lowered to half precision 38.

For each computation 24 of the set of operations 22, evaluation component 28 may determine a risk of precision loss 31 and may compare the risk of precision loss to a precision loss threshold 33. The precision loss threshold 33 may identify whether the computation 24 support half precision 38 and/or whether the computation 24 may be sensitive to half precision 38. As such, evaluation component 28 may perform an iterative process in determining whether to lower the precision of the computations 24 within the set of operations 22.

Evaluation component 28 may also take into account power consumption benefits from the conversion operations in determining whether the precision may be lowered and/or where precision loss may be acceptable for the set of operations 22. The power consumption benefits to computer device 102 that may occur when using half precision 38 in the computations 24 may outweigh the loss in precision that may occur from lowering the precision of the computations 24.

For example, evaluation component 28 may receive a range of x=70000 for a value of a computation 24 within the expression tree. Evaluation component 28 may determine that range x=70000 exceeds an expected range 35 for the computation 24 (e.g., the range is outside of the range for half precision values) and may determine that the risk of precession loss 31 is above the precision loss threshold 33. However, evaluation component 28 may determine that the precision of loss may be acceptable to gain the benefit of the power consumption savings to computer device 102 when using the half precision 38 in the computations 24. Evaluation component 28 may modify the risk of precision loss 31 in response to determining the power consumption benefits outweigh the loss in precision.

At 308, method 300 may include providing a notification with a warning for a possible precision loss when the risk of precision loss is above the precision loss threshold. When the risk of precession loss 31 is above precision loss threshold 33, evaluation component 28 may generate a notification 32 with a warning indicating that the computation 24 may not support half precision 38. For example, the risk of precision loss 31 may be above the precision loss threshold 33 if the computation 24 does not work with lower precision (e.g., raising values to a power). In addition, the risk of precision loss 31 may be above the precision loss threshold 33 if GPU 44 does not support lower precisions. In addition, notification 32 may include information about the potential power consumption benefits to computer device 102 by using the half precision 38 in the computations 24 and/or information about the potential loss in precision for using the half precision 38. Compiler 16 may transmit notification 32 to user interface 50 so that a user may use the information when editing program code 14.

At 310, method 300 may include generating edited program code by rewriting the computation to a half precision when the risk of precision loss is below the precision loss threshold. When the risk of precession loss 31 is below precision loss threshold 33, evaluation component 28 may identify the computation 36 has supporting half precision 38. The risk of precision loss 31 may be below precision loss threshold 33 if the computation 24 supports lower precision and/or if GPU 44 supports lower precisions.

Precision lowering manager 20 may automatically generate edited program code 34 by rewriting the precision of the identified computations 36 with half precision 38. Precision lowering manager 20 may also generate a report 40 with information of the changes made to the precision. For example, report 40 may include the identified computations 36 and/or set of operations 22. Report 40 may also include explanations for the changes to the precision and/or decision to not lower the precision. In another aspect, report 40 may include the identified computations 36 for half precision 38 and the report 40 may be transmitted to user interface 50 for a user to review and/or modify program code 14 in response to the information provided in report 40.

At 312, method 300 may include providing the edited program code. Compiler 16 may transmit the edited program code to GPU 44 for processing. GPU 44 may execute the edited program code 34 using the half precision 38 for the identified computations 36 to generate output 46 for presentation on display 48. By using half precision 38 in the identified computations 36, the throughput in GPU 44 of the identified computations 36 used in shader program 12 may improve, as well as speeding up memory accesses by GPU 44.

Method 300 may be used to safely lower precision of operations within shader program 12 from single precision 26 to half precision 38, and thus, improving the performance of the shader program 12.

Figure 4:
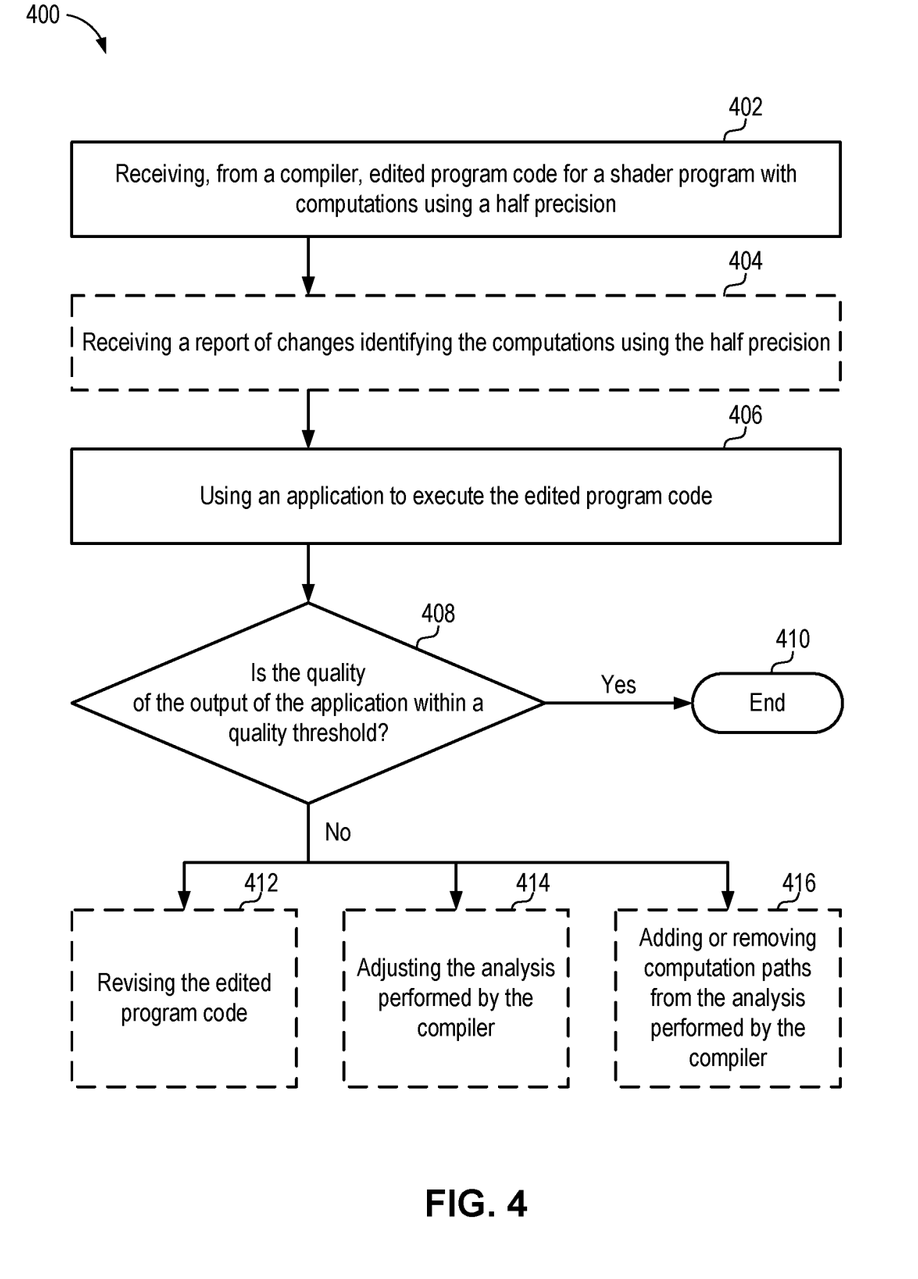
FIG. 4 is a flowchart of an example method for evaluating lower precision of computations used in shader programs in accordance with an implementation of the present disclosure.

Referring now to FIG. 4, a method 400 that may be used by computer device 102 (FIG. 1) to evaluate lower precision of computations 24 (FIG. 1) used in shader programs 12 (FIG. 1). The actions of method 400 may be discussed below with reference to the architecture of FIG. 1.

At 402, method 400 may include receiving, from a compiler, edited program code for a shader program with computations using a half precision. Compiler 16 may transmit edited program code 34 to user interface 50 for display.

At 404, method 400 may optionally include receiving a report of changes identifying the computations using the half precision. In an aspect, a user may use the information in report 40 to perform further edits to program code 14 and/or edited program code 34 and create revised program code 52. For example, a user may change the precision of the identified computations 36 in the program code 14. In addition, the user may select to change a portion of the identified computations to half precision 38. As such, the user may use the provided information as a guide to lowering precision within shader program 12.

At 406, method 400 may include using an application to execute the edited program code. The user may open application 10 or a trace of application 10 using user interface 50 and may run the received edited program code 34 from compiler 16 using the application 10.

At 408, method 400 may include determining whether the quality of the output of the application is within a quality threshold. The image quality of the output 46 may be evaluated to determine whether the shader program 12 may tolerate reduced precision without degrading the image quality of the output 46. For example, the image quality of rendered image 47 may be compared to a quality threshold 30 to determine whether quality of the rendered image 47 is within a quality threshold. When there is little to no loss in image quality of the rendered image 47, the quality of the rendered image 47 may be below the quality threshold. As such, the shader program 12 may tolerate reduced precision without degrading image quality in the output 46, and at 310, method 300 may end.

When there is a loss in image quality of the rendered image 47, the quality of the rendered image 47 may be above the quality threshold. As such, the shader program 12 may not tolerate reduced precision without degrading image quality in the output 46 and further revisions and/or changes to the shader program 12 may be made.

At 412, method 400 may optionally include revising the edited program code. When there is a loss in image quality, the user may revise the edited program code 34 and generate revised program code 52 changing the amount of lower precision used in the shader program 12. The revised program code 52 may be transmitted to compiler 16 for further evaluation and/or modification.

At 414, method 400 may optionally include adjusting the analysis performed by the compiler. In addition, when there is a loss in image quality, the user may make adjustments to the analysis performed by compiler 16. For example, the user may remove specific instructions from the search performed by compiler 16 so that the compiler may not identify the instructions as tolerating lower precision. In addition, a user may turn off the pass 18 that performs the search to identify the set of operations 22 where precision may be lowered.

At 416, method 400 may optionally include adding or removing computation paths from the analysis performed by the compiler. A user may also identify one or more computations 24 where precision may be lowered within the shader program code 14 and transmit the computations 24 to compiler 16 for evaluation. Evaluation component 28 may evaluate whether precision may be lowered for the computations 24 and may provide notifications 32 to the user with warnings about possible precision loss. The user may change the precision of the computations 24 in response to the information received from compiler 16 14 and may generate revised program code 52. The revised program code 52 may be transmitted to compiler 16 for further evaluation and/or modification.

Method 400 may provide users an interactive process for lowering precision in shader programs. In addition, method 400 may provide users more detail and/or information to use when making decisions for lowering precision in shader programs. As such, users may be able to quantify precision loss more easily when developing shader programs.

Figure 5:
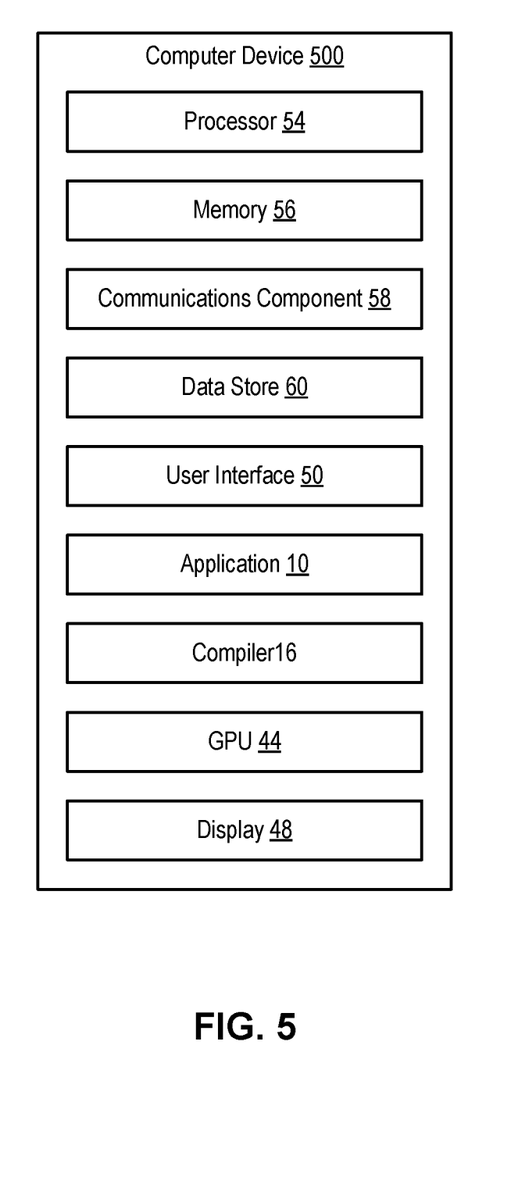
FIG. 5 is a schematic block diagram of an example device in accordance with an implementation of the present disclosure.

Referring now to FIG. 5 an example computer 500 that may be configured as computer device 102 in accordance with an implementation includes additional component details as compared to FIG. 1. In one example, computer 500 may include processor 54 for carrying out processing functions associated with one or more of components and functions described herein. Processor 54 can include a single or multiple set of processors or multi-core processors. Moreover, processor 54 can be implemented as an integrated processing system and/or a distributed processing system.

Computer 500 may further include memory 56, such as for storing local versions of applications being executed by processor 54. Memory 56 can include a type of memory usable by a computer, such as random access memory (RAM), read only memory (ROM), tapes, magnetic discs, optical discs, volatile memory, non-volatile memory, and any combination thereof. Additionally, processor 54 may include and execute operating system 110 (FIG. 1).

Further, computer 500 may include a communications component 58 that provides for establishing and maintaining communications with one or more parties utilizing hardware, software, and services as described herein. Communications component 58 may carry communications between components on computer device 102, as well as between computer device 102 and external devices, such as devices located across a communications network and/or devices serially or locally connected to computer device 102. For example, communications component 58 may include one or more buses, and may further include transmit chain components and receive chain components associated with a transmitter and receiver, respectively, operable for interfacing with external devices.

Additionally, computer 500 may include a data store 60, which can be any suitable combination of hardware and/or software, that provides for mass storage of information, databases, and programs employed in connection with implementations described herein. For example, data store 60 may be a data repository for applications 10, GPU 44, compiler 16, and/or display 48.

Computer 500 may also include a user interface component 50 operable to receive inputs from a user of computer device 102 and further operable to generate outputs for presentation to the user. User interface component 50 may include one or more input devices, including but not limited to a keyboard, a number pad, a mouse, display 48 (e.g., which may be a touch-sensitive display), a navigation key, a function key, a microphone, a voice recognition component, any other mechanism capable of receiving an input from a user, or any combination thereof. Further, user interface component 50 may include one or more output devices, including but not limited to a display, a speaker, a haptic feedback mechanism, a printer, any other mechanism capable of presenting an output to a user, or any combination thereof.

In an implementation, user interface component 50 may transmit and/or receive messages corresponding to the operation of applications 10, GPU 44, compiler 16, and/or display 48. In addition, processor 54 executes applications 10, GPU 44, compiler 16, and/or display 48, and memory 56 or data store 60 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:
1. A computer device, comprising:
 a graphics processing unit (GPU) that supports half precision storage and arithmetic in shader programs;
 a memory to store data and instructions;
 at least one processor configured to communicate with the memory;
 a compiler in communication with the memory and the at least one processor, wherein the compiler is operable to:
  receive program code for a shader program to use with the GPU;
  perform at least one pass on the program code to automatically analyze a structure of the program code and select a set of operations within the program code to lower a precision of a plurality of computations used by the set of operations in response to the analysis identifying the set of operations as supporting half precision, wherein the analysis is a trained search that uses hardware information in combination with a list of previously defined operations that support half precisions and a list of previously defined operations sensitive to precision lowering for identifying the set of operations as supporting half precision;
  evaluate a risk of precision loss for lowering the precision for a computation to a half precision for each computation of the plurality of computations;
  generate edited program code by rewriting the computation to the half precision in response to the risk of precision loss being below a precision loss threshold;
  provide a notification with a warning for possible precision loss in response to the risk of precision loss being above the precision loss threshold; and
  generate a report with information of changes made to precision in the edited program code, wherein the report identifies one or more computations in the edited program where the precision was lowered and provides information on decisions to maintain the precision for other computations in the edited program code.

2. The computer device of claim 1, wherein the precision loss threshold identifies whether the computation supports the half precision.

3. The computer device of claim 1, wherein the set of operations are selected in response to being previously identified as supporting half precision or in response to user input.

4. The computer device of claim 1, wherein hardware parameters of the GPU are used by the compiler to evaluate the risk of precision loss.

5. The computer device of claim 1, wherein the risk of precision loss is above the precision loss threshold where the computation does not support the half precision.

6. The computer device of claim 1, wherein the risk of precision loss is below the precision loss threshold where the computation supports the half precision.

7. The computer device of claim 1, wherein the compiler is further operable to perform an iterative process in determining whether to lower the precision of the plurality of computations within the set of operations.

8. The computer device of claim 1, wherein the report identifies changes made to the precision of the computation and provides an explanation of the changes made.

9. The computer device of claim 1, wherein the compiler is further operable to:
provide the edited program code to the GPU for processing into an output to present on a display; and
provide the notification to a user interface on the display.

10. A method for lowering precision of computations used in shader programs, comprising:
receiving, at a compiler on a computer device, program code for a shader program to use with a graphics processing unit (GPU) that supports half precision storage and arithmetic in the shader programs;
performing at least one pass on the program code to automatically analyze a structure of the program code and select a set of operations within the program code to lower a precision of a plurality of computations used by the set of operations in response to the analysis identifying the set of operations as supporting half precision, wherein the analysis is a trained search that uses hardware information in combination with a list of previously defined operations that support half precisions and a list of previously defined operations sensitive to precision lowering for identifying the set of operations as supporting half precision;
evaluating a risk of precision loss for lowering the precision for a computation to a half precision for each computation of the plurality of computations;
generating edited program code by rewriting the computation to the half precision in response to the risk of precision loss being below a precision loss threshold;
providing a notification with a warning for precision loss in response to the risk of precision loss being above the precision loss threshold; and
generate a report with information of changes made to precision in the edited program code, wherein the report identifies one or more computations in the edited program where the precision was lowered and provides information on decisions to maintain the precision for other computations in the edited program code.

11. The method of claim 10, wherein the precision loss threshold identifies whether the computation supports the half precision.

12. The method of claim 10, wherein the set of operations are selected in response to being previously identified as supporting half precision or in response to user input.

13. The method of claim 10, wherein hardware parameters of the GPU are used by the compiler to evaluate the risk of precision loss.

14. The method of claim 10, wherein the risk of precision loss is above the precision loss threshold where the computation does not support the half precision.

15. The method of claim 10, wherein the risk of precision loss is below the precision loss threshold where the computation supports the half precision.

16. The method of claim 10, further comprising:
performing an iterative process in determining whether to lower the precision of the plurality of computations within the set of operations.

17. The method of claim 10, wherein the report identifies changes made to the precision of the computation and provides an explanation of the changes made.

18. The method of claim 10, wherein the method further comprises:
adjusting a level of analysis on the program code in response user input.

19. The method of claim 10, wherein the method further comprises:
providing the edited program code to the GPU for processing into an output to present on a display; and
providing the notification to a user interface on the display.

20. A non-transitory computer-readable medium storing instructions executable by a computer device, comprising:
at least one instruction for causing the computer device to receive program code for a shader program to use with a graphics processing unit (GPU) that supports half precision storage and arithmetic in shader programs;
at least one instruction for causing the computer device to perform at least one pass on the program code to automatically analyze a structure of the program code and select a set of operations within the program code to lower a precision of a plurality of computations used by the set of operations in response to the analysis identifying the set of operations as supporting half precision, wherein the analysis is a trained search that uses hardware information in combination with a list of previously defined operations that support half precisions and a list of previously defined operations sensitive to precision lowering for identifying the set of operations as supporting half precision;
at least one instruction for causing the computer device to evaluate a risk of precision loss for lowering the precision for a computation to a half precision for each computation of the plurality of computations;
at least one instruction for causing the computer device to generate edited program code by rewriting the computation to the half precision in response to the risk of precision loss being below a precision loss threshold;
at least one instruction for causing the computer device to provide a notification with a warning for precision loss in response to the risk of precision loss being above the precision loss threshold; and
at least one instruction for causing the computer device to generate a report with information of changes made to precision in the edited program code, wherein the report identifies one or more computations in the edited program where the precision was lowered and provides information on decisions to maintain the precision for other computations in the edited program code.

* * * * *